US010880760B2

(12) United States Patent
Ramachandra et al.

(10) Patent No.: US 10,880,760 B2
(45) Date of Patent: Dec. 29, 2020

(54) IDENTIFICATION OF NEIGHBORING NETWORK NODES IN A WIRELESS COMMUNICATION NETWORK

(71) Applicant: Telefonaktiebolaget LM Ericsson (publ), Stockholm (SE)

(72) Inventors: Pradeepa Ramachandra, Linköping (SE); Mehdi Amirijoo, Linköping (SE); Andreas Bergström, Linköping (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/323,579

(22) PCT Filed: Sep. 13, 2016

(86) PCT No.: PCT/SE2016/050848
§ 371 (c)(1),
(2) Date: Feb. 6, 2019

(87) PCT Pub. No.: WO2018/052343
PCT Pub. Date: Mar. 22, 2018

(65) Prior Publication Data
US 2019/0208431 A1 Jul. 4, 2019

(51) Int. Cl.
*H04W 24/02* (2009.01)
*H04W 36/00* (2009.01)
(Continued)

(52) U.S. Cl.
CPC ........... *H04W 24/02* (2013.01); *H04L 5/0051* (2013.01); *H04W 36/0061* (2013.01);
(Continued)

(58) Field of Classification Search
None
See application file for complete search history.

(56) References Cited

U.S. PATENT DOCUMENTS

2010/0197298 A1* 8/2010 So .................... H04W 24/10
455/424
2010/0216470 A1* 8/2010 Pamp .................. H04W 36/20
455/436

(Continued)

OTHER PUBLICATIONS

International Search Report and Written Opinion of the International Searching Authority, PCT/SE2016/050848, dated May 18, 2017, 11 pages.

(Continued)

*Primary Examiner* — Otis L Thompson, Jr.
(74) *Attorney, Agent, or Firm* — Sage Patent Group

(57) ABSTRACT

Methods, nodes and arrangements for supporting identification of one or more neighboring network nodes comprised in a wireless communication network. A communication device is associated with a communicative connection to a first network node, e.g. a serving base station. The communication device obtains a first identifier identifying the first network node, and transmits the obtained first identifier in an uplink so that the first identifier is receivable by one or more other, second network nodes, e.g. non-serving base stations. Receipt of the first identifier by a second network node enables identification of the first radio network node as neighboring said second radio network node. The second network node obtains, based on the first identifier, an address of the first network node, and/or a second identifier uniquely identifying the first network node, in the wireless communication network.

10 Claims, 7 Drawing Sheets

(51) Int. Cl.
*H04W 76/11* (2018.01)
*H04L 5/00* (2006.01)
*H04W 74/08* (2009.01)

(52) U.S. Cl.
CPC . *H04W 36/00835* (2018.08); *H04W 74/0833* (2013.01); *H04W 76/11* (2018.02); *H04W 36/0083* (2013.01)

(56) References Cited

U.S. PATENT DOCUMENTS

| | | | | |
|---|---|---|---|---|
| 2011/0103315 | A1* | 5/2011 | Camp, Jr. | H04L 1/1854 |
| | | | | 370/329 |
| 2012/0225650 | A1* | 9/2012 | Son | H04W 36/30 |
| | | | | 455/434 |
| 2013/0258895 | A1* | 10/2013 | Kim | H04J 11/0056 |
| | | | | 370/252 |
| 2015/0055448 | A1 | 2/2015 | Lee et al. | |
| 2015/0181477 | A1* | 6/2015 | Chaudhuri | H04W 36/00835 |
| | | | | 455/436 |
| 2015/0312776 | A1 | 10/2015 | Cui et al. | |
| 2016/0105920 | A1* | 4/2016 | Huang | H04W 24/02 |
| | | | | 370/328 |
| 2016/0205499 | A1* | 7/2016 | Davydov | G01S 1/20 |
| | | | | 455/456.1 |
| 2016/0242080 | A1 | 8/2016 | Vikberg et al. | |
| 2016/0262088 | A1* | 9/2016 | Frenger | H04W 74/0833 |
| 2017/0078895 | A1* | 3/2017 | Sriram | H04W 24/10 |
| 2017/0150436 | A1* | 5/2017 | Modarres Razavi | |
| | | | | G01S 5/0215 |
| 2017/0289932 | A1* | 10/2017 | Islam | H04W 56/001 |
| 2018/0063692 | A1* | 3/2018 | Ramachandra | H04W 48/16 |
| 2018/0070256 | A1* | 3/2018 | Damnjanovic | H04W 24/10 |

OTHER PUBLICATIONS

Anders Dahlen et al, Evaluations of LTE Automatic Neighbor Relations, Vehicular Technology Conference, 2011 IEEE 734d, IEEE, May 15, 2011, pp. 1-5, XP03189700.

* cited by examiner

IDENTIFICATION OF NEIGHBORING NETWORK NODES IN A WIRELESS COMMUNICATION NETWORK

CROSS REFERENCE TO RELATED APPLICATIONS

This application is a 35 U.S.C. § 371 national stage application of PCT International Application No. PCT/SE2016/050848 filed on Sep. 13, 2016, the disclosure and content of which is incorporated by reference herein in its entirety.

TECHNICAL FIELD

Embodiments herein concern methods and arrangements relating to identification of neighboring network nodes in a wireless communication network, e.g. a telecommunication network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) is used for the transmission path from the base station to the wireless device. The expression uplink (UL) is used for the transmission path in the opposite direction i.e. from the wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G). A design principle under consideration for 5G wireless communication networks is to base it on an ultra-lean design. This implies that "always on signals", such as reference signals in LTE, shall be avoided in the network as much as possible. The expected benefit from this design principle is expected to be significantly lower network energy consumption, better scalability, higher degree of forward compatibility, lower interference from system overhead signals and consequently higher throughput in low load scenario, and also improved support for user centric beam-forming.

Advanced Antenna Systems (AAS) is an area where technology has advanced significantly in recent years and where we also foresee a rapid technology development in the years to come. Hence it is natural to assume that advanced antenna systems in general and massive Multiple Input Multiple Output (MIMO) transmission and reception in particular, will be a cornerstone in a future 5G wireless communication network.

As beam-forming becomes increasingly popular and capable it becomes natural to use it not only for transmission of data but also for transmission of control information. This is one motivation behind the relatively new control channel in LTE known as enhanced Physical Downlink Control CHannel (ePDCCH). When a control channel is beamformed, the cost of transmitting the overhead control information can be reduced due to the increased link budget provided by additional antenna gain. This is a good property that likely will be utilized also for 5G, perhaps to an even larger degree than what is possible in the currently in LTE.

Despite advanced radio network planning tools, it is very difficult to predict the radio propagation in detail. As a consequence, it is difficult to predict which base stations that need to have a relation and perhaps also a direct connection prior to the network deployment. This is addressed in LTE, where UEs can be requested to retrieve unique information from the system information broadcast of unknown base stations and report to the serving base station. Such information is used to convey messages to the unknown base station via the core network, which maintains a lookup table from a unique identifier to an established S1 connection. One such message is used to request transport network layer address information necessary for a direct base station to base station connection for the X2 interface.

The mobility procedure in 5G is planned to be beam based, where the reference signals defining such a beam is defined via specific Reference Signals (RS), that may be named Mobility Reference Signals (MRS), and can be activated by the node/s when a wireless communication device, such as a UE, is in need of making a handover. Thus the mobility procedure may be enabled via turning on a MRS on a selected set of beams, that may be named MRS beams, for the wireless communication device to measure and report back after which a network node decides on which such MRS beam will become the new serving beam for the wireless communication device in question. Which MRS beams to be transmitted by network nodes may depend on several factors including the current serving beam. Therefore, a network node may maintain a beam-to-beam relation table, that simply may be named a beam relation table, in order to refer which beam needs to be transmitted by the network node(s) to aid mobility of the wireless communication device.

In order for smooth operation of the mobility procedure in 5G, a 5G network node is need to have a concrete list of neighboring 5G nodes which can be handover candidates for wireless communication devices. In LTE, a corresponding neighbor relations table is established by using "always on signals" from the neighboring node(s). This is well studied for the Automatic Neighbor Relations (ANR) concept, see e.g. Evaluations of LTE Automatic Neighbor Relations", Fredrik Gunnarsson et al, conference paper, Proceedings of the 73rd IEEE Vehicular Technology Conference, VTC Spring 2011, 15-18 May 2011, Budapest, Hungary.

Hence, in LTE, the solution for establishing neighbor base station relation establishment is based on "always-on" reference signals. However, as discussed above, such "always-on" signaling will be absent or present to a much lesser extent in 5G, and therefore existing LTE solutions are not suitable.

SUMMARY

In view of the above, an object is to provide one or more improvements with regard to establishing neighbour node relations in a wireless communication network, such as to enable identification of neighboring radio network nodes without having to rely on such "always on" signaling as in LTE.

According to a first aspect of embodiments herein, the object is achieved by a first method, performed by a communication device, for supporting identification of one or more neighboring network nodes comprised in a wireless communication network. The communication device is associated with a communicative connection to a first network node. The communication device obtains a first identifier identifying the first network node. The communication device then transmits the obtained first identifier in an uplink so that the first identifier is receivable by one or more other, second network nodes, whereby receipt of the first identifier by a second network node enables identification of the first radio network node as neighboring said second radio network node.

According to a second aspect of embodiments herein, the object is achieved by a computer program comprising instructions that when executed by a communication device causes the communication device to perform the first method according to the first aspect.

According to a third aspect of embodiments herein, the object is achieved by a carrier comprising the computer program according to the second aspect.

According to a fourth aspect of embodiments herein, the object is achieved by a second method, performed by a first network node, for supporting identification of one or more neighboring network nodes comprised in a wireless communication network. The first network node is associated with a communicative connection to a communication device. The first network node obtains (203; 501) a first identifier identifying the first network node. The first network node then sends the obtained first identifier to the communication device, the first identifier to be transmitted by the communication device in the uplink so that the first identifier is receivable by one or more other, second network nodes. Receipt of the first identifier by a second network node enables identification of the first radio network node as neighboring said second radio network node.

According to a fifth aspect of embodiments herein, the object is achieved by a computer program comprising instructions that when executed by a first network node causes the first network node to perform the method according to the fourth aspect.

According to an sixth aspect of embodiments herein, the object is achieved by a carrier comprising the computer program according to the fifth aspect.

According to an seventh aspect of embodiments herein, the object is achieved by a third method, performed by a second network node, for supporting identification of one or more neighboring network nodes comprised in a wireless communication network. The second network node receives, from a communication device, a first identifier transmitted by the communication device in the uplink. The first identifier is identifying a first network node associated with a communicative connection to the communication device, whereby the first network node is identifiable as neighboring the second network node. The second network node obtains, based on the first identifier, an address of the first network node in the wireless communication network and/or a second identifier uniquely identifying the first network node in the wireless communication network.

According to an eight aspect of embodiments herein, the object is achieved by a computer program comprising instructions that when executed by a second network node causes the second network node to perform the method according to the seventh aspect.

According to a ninth aspect of embodiments herein, the object is achieved by a carrier comprising the computer program according to the eighth aspect.

According to a tenth aspect of embodiments herein, the object is achieved by a fourth method, performed by an arrangement, for supporting identification of one or more neighboring network nodes comprised in a wireless communication network. The arrangement manages mapping between a first identifier and an address of a first network node in the wireless communication network, and/or mapping between the first identifier and a second identifier uniquely identifying the first network node in the wireless communication network. The arrangement receives, from a second network node, a request requesting the address and/or the second identifier. The request comprises the first identifier after it has been received in the uplink by the second network node when the first identifier was transmitted in the uplink by a communication device associated with a communicative connection to the first network node. The arrangement obtains, in response to the request and based on the first identifier and the mapping, the address and/or the second identifier. The arrangement sends, to the second network node, the address and/or the second identifier.

According to an eleventh aspect of embodiments herein, the object is achieved by a computer program comprising instructions that when executed by an arrangement causes the arrangement to perform the method according to the tenth aspect.

According to a twelfth aspect of embodiments herein, the object is achieved by a carrier comprising the computer program according to the eleventh aspect.

According to an thirteenth aspect of embodiments herein, the object is achieved by a communication device for supporting identification of one or more neighboring network nodes comprised in a wireless communication network. The communication device being associated with a communicative connection to a first network node. The communication device is configured to obtain a first identifier identifying the first network node. The communication device is further configured to transmit the obtained first identifier in an uplink so that the first identifier is receivable by one or more other, second network nodes, whereby receipt of the first identifier by a second network node enables identification of the first radio network node as neighboring said second radio network node.

According to an fourteenth aspect of embodiments herein, the object is achieved by a first network node for supporting identification of one or more neighboring network nodes comprised in a wireless communication network. The first network node being associated with a communicative connection to a communication device. The first network node is configured to obtain a first identifier identifying the first network node The first network node is further configured to send the obtained first identifier to the communication device. The first identifier to be transmitted by the communication device in the uplink so that the first identifier is receivable by one or more other, second network nodes, whereby receipt of the first identifier by a second network node enables identification of the first radio network node as neighboring said second radio network node.

According to an fifteenth aspect of embodiments herein, the object is achieved by a second network node for supporting identification of one or more neighboring network nodes comprised in a wireless communication network. The second network node is configured to receive, from a communication device, a first identifier transmitted by the communication device in the uplink, the first identifier identifying a first network node associated with a communicative connection to the communication device, whereby the first network node is identifiable as neighboring the second network node. The second network node is further configured to obtain, based on the first identifier, an address of the first network node in the wireless communication network and/or a second identifier uniquely identifying the first network node in the wireless communication network.

According to an sixteenth aspect of embodiments herein, the object is achieved by an arrangement for supporting identification of one or more neighboring network nodes comprised in a wireless communication network. The arrangement being configured to manage mapping between a first identifier and an address of a first network node in the wireless communication network, and/or mapping between the first identifier and a second identifier uniquely identifying the first network node in the wireless communication network. The arrangement is configured to receive, from a second network node, a request requesting the address and/or the second identifier. The request comprises the first identifier after it has been received in the uplink by the second network node when the first identifier was transmitted in the uplink by a communication device associated with a communicative connection to the first network node. The arrangement is further configured to obtain, in response to the request and based on the first identifier and the mapping, the address and/or the second identifier. Furthermore, the arrangement is configured to send, to the second network node, the address and/or the second identifier.

A communication device as above has a communicative connection to its serving radio network node, but typically not to non-serving radio network nodes. Hence, the first radio network node according to embodiments herein corresponds to a serving network node for the communication device, and said one or more second radio network nodes may correspond to non-serving radio network nodes for the communication device. This means that identification of neighbouring radio network nodes based on uplink transmission, typically a broadcast, of the first identifier as in embodiment herein, i.e. the first identifier identifying the first, such as serving, radio network node, can be recognized as "the opposite" to how neighbouring radio network nodes are identified in LTE. In LTE it is instead the non-serving radio network nodes that identify themselves though downlink signalling based on "always-on" reference signals. In both cases, it is utilized that two radio network nodes are neighbouring each other if a communication device at some location can receive certain radio signals from both these radio network nodes. According to embodiments herein, it is typically required that the second, such as non-serving, radio network nodes actively listen in the uplink to thereby be able to receive, the first identifier, and they may also be required to more actively participate in the rest of the process of identifying neighbour radio network nodes, compared to LTE, but there is no need that they provide such "always on" signalling as in LTE.

Hence, embodiments herein enable identification of neighboring radio network nodes without having to rely on such "always on" signaling as in LTE and thereby it is provided an improvement with regard to establishing neighbour node relations in a wireless communication network.

BRIEF DESCRIPTION OF THE DRAWINGS

Examples of embodiments herein are described in more detail with reference to the appended schematic drawings, which are briefly described in the following.

DETAILED DESCRIPTION

Figure 1:
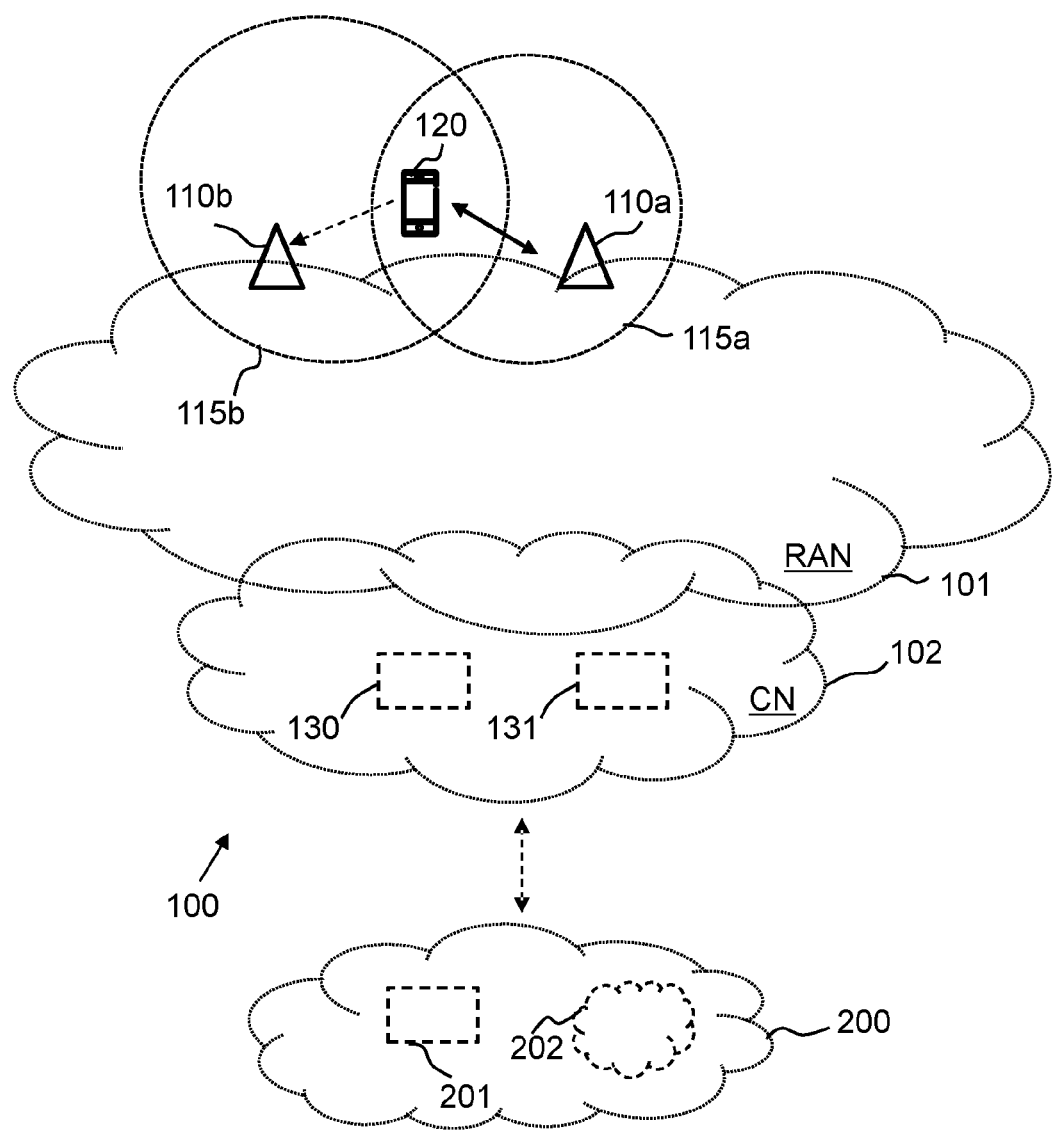
FIG. 1 is a block diagram schematically depicting an example of a wireless communication network relevant for embodiments herein.

Throughout the following description similar reference numerals may be used to denote similar elements, units, modules, circuits, nodes, parts, items or features, when applicable. Features that appear only in some embodiments of what is shown in a figure, are typically indicated by dashed lines in the drawings.

In the following, embodiments herein are illustrated by exemplary embodiments. It should be noted that these embodiments are not necessary mutually exclusive. Components from one embodiment may be tacitly assumed to be present in another embodiment and it will be obvious to a person skilled in the art how those components may be used in the other exemplary embodiments.

As indicated in the background, in prior art wireless communication networks such as LTE, identification of neighbouring base stations to a serving base station, is based on that non-serving base stations identify themselves though downlink signalling based on "always-on" reference signals. If a UE being served by a serving base station can receive downlink signalling from and identifying the non-serving base stations, these are neighbouring the serving base station. The UE reports the identification to the serving base station that then e.g. can establish neighbour node relations and/or e.g. set up communication, e.g. establish communication interfaces, such as X2, directly between the neighbouring non-serving base stations. The procedure in LTE is thus based on downlink transmissions.

In contrast, a procedure relating to embodiments herein is based on uplink transmissions. If the same naming is used as in LTE to facilitate comparison, this means that the serving base station instead would identify itself in the uplink, to the non-serving base stations. The non-serving base stations that receives the uplink transmission that identifies the serving base station, at least locally, may then report this further so that the serving base station can be uniquely identified in the wireless communication network 100, neighbor node relations can be established and/or they can eventually set up direct communication, e.g. establish communication interfaces, with the serving base station as neighbouring node.

For example, a serving base station may configure a UE that it is serving to transmit a first identifier identifying the serving base station, e.g. transmit a unique ID which may be uniquely identifying the serving base station but only during e.g. a predetermined and/or predefined duration, i.e. time period. The first identifier may thus be allocated for temporary use. The uplink transmission by the UE may then be detected by neighboring non-serving base stations, which receives the first identifier from the uplink transmission and may then also store a time of transmission, e.g. by associating, such as storing, a time of receipt of the transmission together with the first identifier. Receipt of the first identifier, and/or the time of receipt, may then be used to trigger a neighbor relation establishment procedure, e.g. with the help of yet another network node or entity, e.g. OAM node, that is knowledgeable of first identifiers of different base stations and the time periods they have been used, i.e. are valid. Said yet another node may thus know the time when a certain first identifier was used by a certain base station, and thereby can find a more permanent and unique identity, such as an address, of the identified serving base station in the wireless communication network.

FIG. 1 is a schematic block diagram schematically depicting an example of a wireless communication network 100 that is relevant for embodiments herein and in which embodiments herein may be implemented. The wireless communication network 100 may comprise a Radio Access Network (RAN) 101 part and a core network (CN) 102 part. The wireless communication network 100 is typically a telecommunication network or system, such as a cellular communication network that supports at least one Radio Access Technology (RAT), e.g. New Radio (NR) that also may be referred to as 5G, and that may be based on a so called "lean design", where "always on" signaling is not used or present, or at least desirable to keep to a minimum. By "always on" signaling is typically meant downlink radio signals that are broadcasted continuously or at least very frequently and independently on if there is any communication device present or not for receiving the downlink signals. The "always on" downlink signaling typically comprises downlink reference signals identifying nodes and/or cells transmitting them so that a communication device thereby can identify, measure on and possibly connect to these nodes and/or cells.

The wireless communication network 100 comprises network nodes that are communicatively interconnected. The network nodes may be logical and/or physical and are located in one or more physical devices. The wireless communication network 100 comprises a first network node 110a, and a second network node 110b, typically radio network nodes, i.e. network nodes being or comprising a radio transmitting network nodes, such as base stations, and/or that are being or comprising controlling nodes that control one or more radio transmitting network nodes.

The wireless communication network 100, or specifically one or more network nodes thereof, e.g. the first network node 110a and the second network node 110b, is typically configured to serve and/or control and/or manage one or more communication devices, such as communication device 120, in radio coverage areas, i.e. an area where radio coverage is provided for communication with one or more communication devices. Each radio coverage may be provided by and/or associated with a particular RAT. The radio coverage may be radio coverage of a cell, or a radio beam, typically named only beam, or of a set or group of radio beams. The set or group may be radio beams that are transmitting identical identifiers, e.g. all radio beams provided by a one or more network nodes that transmit the same identifier, or in other words that have a common identifier. As should be recognized by the skilled person, a so called beam is a more dynamic and relatively narrow and directional radio coverage compared to a conventional cell, and is typically accomplished by so called beamforming. A beam is typically for serving one or a few communication devices at the same time, and may be specifically set up for serving this one or few communication devices. The beam may be changed dynamically by beamforming to provide desirable coverage for the one or more communication devices being served by the beam. Similar to a cell, a beam is typically associated with a beam identity, that may be transmitted by the beam, and that in turn is typically, directly or indirectly, also identifying the network node providing the beam. Such identifier mentioned above that is the same for the set or group of beams, may directly or indirectly identify the beams of the set or group, e.g. by their beam identities, and similarly also identify the network node, or nodes, providing said set or group of beams.

In the shown example there is a first radio coverage area 115a that may correspond to a cell or one or more radio beams, such as 5G or NR radio beams, provided by the first network node 110a. There is also a second radio coverage area 115b that may correspond to a cell or one or more radio beams, such as 5G or NR radio beams, provided by the second network node 110b. Although not shown in the example, it should be noted that there may be more than one radio coverage area and/or multiple radio beams provided by each network node.

In the figure, and in a exemplifying scenario: The communication device 120 is located in the first radio coverage area 115a and has a communicative connection with, e.g. is served in, the first radio coverage area 115a by the first network node 110a. At the same time the communication device 120 is able to reach the second network node 110b by uplink transmission, e.g. by broadcast, comprising a first identifier identifying the first network node 110a. In other words, the second network node 110b is able to receive this uplink transmission. The uplink transmission and the first identifier may be associated with the first radio coverage area 115a, e.g. may be transmitted in it. The first identifier may e.g. be common for one or more radio beams that correspond to the first radio coverage area 115a, as discussed above. That the second network node 110b is able to receive the uplink transmission may mean that the communication device 120 is also located in the second radio coverage area 115b, as shown in the figure, although not currently having a communicative connection with, e.g. is not currently being served in, the second radio coverage area 115b by the second network node 110b.

Further, the wireless communication network 100 may comprise one or more central nodes, e.g. a first central node 130 and a second central node 131 i.e. one or more network nodes that are common or central and communicatively connected to multiple other nodes, e.g. multiple radio network nodes, and may be for managing and/or controlling these nodes. The first central node 130 may e.g. be an OAM node and the second central node 131 may e.g. be an entity for managing identifiers, such as an Identifier Management Entity (IME), that may be separate from an OAM node. In some embodiments the second central node may be a Positioning Management (PM) node or PM Entity (PME). The one or more central nodes may be comprised in the CN 102, and may thus be or comprise one or more core network nodes, and/or may e.g. be one or more internal management nodes of the wireless communication network 100.

The wireless communication network, e.g. the CN 102, may further be communicatively connected to, and thereby e.g. provide access for said communication devices, to an external network 200, e.g. the Internet. The communication device 120 may thus communicate via the wireless communication network 100, with the external network 200, or rather with one or more other devices, e.g. servers and/or other communication devices connected to other wireless communication networks, and that are connected with access to the external network 200.

Moreover, there may be one or more external nodes, e.g. an external node 201, for communication with the wireless communication network 100 and node(s) thereof. The external node 201 may e.g. be an external management node. Such external node may be comprised in the external network 200 or may be separate from this.

Furthermore, the one or more external nodes may correspond to or be comprised in a so called computer, or computing, cloud, that also may be referred to as a cloud system of servers or computers, or simply be named a cloud, such as a computer cloud 202 as shown in the figure, for providing certain service(s) to outside the cloud via a communication interface. The exact configuration of nodes etc. comprised in the cloud in order to provide said service(s) may not be known outside the cloud. The name "cloud" is often explained as a metaphor relating to that the actual device(s) or network element(s) providing the services are typically invisible for a user of the provided service(s), such as if obscured by a cloud. The computer cloud 202, or typically rather one or more nodes thereof, may be communicatively connected to the wireless communication network 100, or certain nodes thereof, and may be providing one or more services that e.g. may provide, or facilitate, certain functions or functionality of the wireless communication network 100. The computer cloud 202 may be comprised in the external network 200 or may be separate from this.

Figure 2:
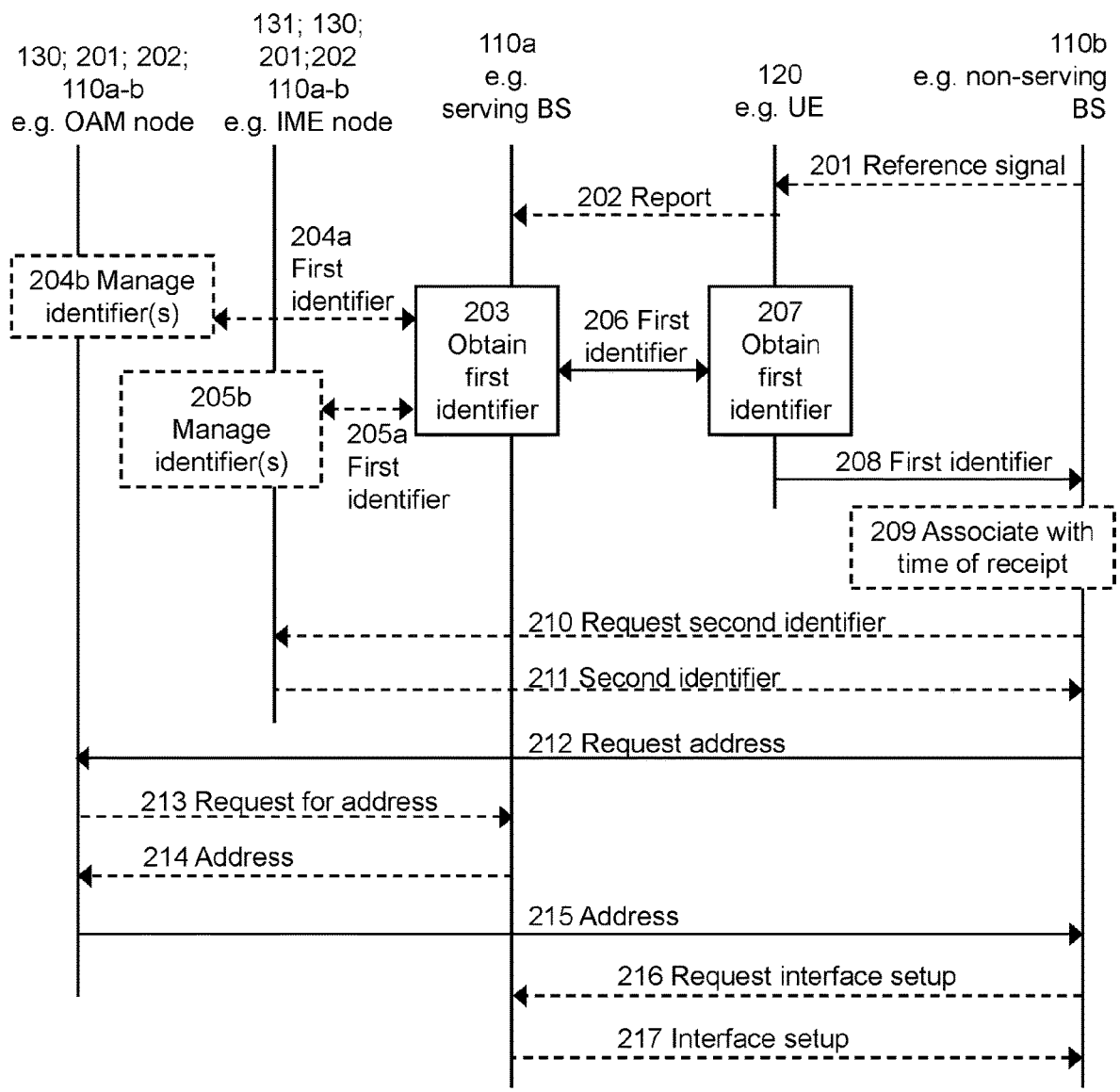
FIG. 2 is a first combined signaling diagram and flowchart for describing some embodiments herein in an exemplary scenario.

FIG. 2 depicts a combined signaling diagram and flowchart, which will be used to discuss embodiments herein in an exemplary scenario. In this scenario, the communication device 120, e.g. a UE, is being served by the first network node 110a that therefore is exemplified as, and named, serving BS in the figure. Also other nodes have been given exemplifying functional naming in the figure to facilitate understanding. Hence, the second network node 110b is exemplified as and named non-serving BS. There is also one or more nodes for managing identifiers that may correspond to the first central node 130, the external node 201 or the computer cloud 202, and may e.g. be a OAM node as exemplified in the figure. As shown, there may also be one or more further nodes for managing identifiers. These may correspond to the second central node 131, the external node 201 or the computer cloud 202, and may e.g. be a IME as exemplified in the figure.

The actions below are for supporting identification of one or more neighboring network nodes, typically radio network nodes, e.g. neighboring network nodes that are not already known by each other, at least not as being neighboring each other.

The actions below may be taken in any suitable order and/or be carried out fully or partly overlapping in time when this is possible and suitable.

Action 201

The communication device 120 may receive a downlink reference signal from the second network node 110b, i.e. here the non-serving BS. The reference signal may e.g. comprise an Access Information Table (AIT) and/or System Signature Index (SSI).

Actions 202

The communication device 120 may report information about the received reference signal in action 201 to the first network node 110a, i.e. here the serving BS of the communication device 120.

In some embodiments, some or all of the actions below are triggered by action 201 and/or 202 (see above), and if the received reference signal, e.g. AIT and/or SSI thereof, is not sufficient to enable the first network node 110a to uniquely identify the second network node 110b transmitting the reference signal in the downlink. Hence, only if there is first an indication that an unknown and thus potentially new neighboring node may be present, then may embodiments herein based on uplink transmission of the first identifier be applied. This removes the risk of unnecessarily performing actions for identification of neighboring nodes that are already known, and it is enabled to use neighbor node identification based on uplink transmissions as in embodiment herein only when downlink signaling is not sufficient for identification of neighboring nodes. Uplink based identification of neighboring nodes as in embodiments herein may thus be combined with a method based on downlink transmission of identifiers, such as from non-serving base stations, and may be used if/when such method is not sufficient alone or simply unsuitable or undesirable to use.

Action 203

The first network node 110a obtains a first identifier identifying the first network node 110a. The first identifier is to be used in an uplink transmission by the communication device 120.

The first identifier may be a unique UpLink transmission Identity or Identifier (ULID). The first identifier may be unique in a neighborhood region of the first network node 110a. For example, the first identifier may be unique only, or at least, in an area that comprises one or more potentially neighboring radio network nodes to the first network node 110a. The potentially neighboring network nodes include at least the second network node 110b.

Further, the first identifier may be valid only for a certain duration, e.g. during a certain time period, that may be predetermined. In other words, the first identifier may be allocated for temporary use, e.g. during a specific time period, wherein the first identifier may validly identify the first network node 110a only during said time period.

In some embodiments, the first identifier is obtained by being allocated, e.g. selected and/or formed, by the first network node 110a. The first identifier may be selected and/or formed according to certain rules or criteria, e.g. selected from a predetermined number of available first identifiers. Information about such rules or criteria, that may be predetermined and/or predefined, may be received from a management node or nodes, e.g. the OAM node. In these embodiment, the first network node 110a is thus involved in allocation of the first identifier.

Furthermore, in some embodiments, the first network node 110a may obtain the first identifier and/or related information by receiving it from one or more other nodes. This is discussed below for actions 204-207.

In some embodiment, the first identifier is an especially reserved random access sequence, e.g. as defined by one Physical Random Access CHannel (PRACH) preamble on a given set of time/frequency resources, and may then be used solely for neighboring node identification, such as used as a first identifier as in embodiment herein, and e.g. for neighboring node relation establishment. How such a random access sequence should be handled by other nodes is e.g. discussed under action 206 below. How many random access sequences, e.g. of a total available amount, that at a time should be reserved to be used as first identifiers, may vary depending on a status and/or 'evolution' of the wireless communication network 100. For example, in case the network is comparatively lightly loaded, then the amount of random access sequences reserved for use as first identifiers could be comparatively large and when/if the network gets more loaded, the amount can be reduced. This may be needed since random access sequences for more normal use are typically needed with an increasing population of communication devices in the wireless communication network 100.

Actions 204a-b, 205a-b

As realized from the above, there is an association, e.g. mapping, that may be temporary, between the first identifier and some unique, and e.g. fix, identity or identifier of the first network node 110b, e.g. an address thereof, in the wireless communication network 100. The association, such as mapping, may also comprise related information, such as a time period during which the first identifier is validly identifying the first network node 110a. The time period is thus a time period during which the first identifier associated with the time period is validly identifying the network node being identified by the first identifier. The association may be realized e.g. by means of a look up table or similar. Said information associated with the first identifier may be referred to as associative information or mapping information in the following.

In some embodiments, the first network node 110a may inform one or more nodes, e.g. the OAM node and/or the IME node, about the obtained first identifier and its associative information. If all relevant network nodes performs like this, one or more nodes, e.g. the OAM node and/or the IME node, will thus be able to provide information about multiple first identifiers with associative information and there may thus be centralized mapping between multiple first identifiers and network nodes.

In some embodiments, the first network node 110a may obtain the first identifier, possibly with associative information, by receiving it from one or more nodes that may be for managing identifiers, e.g. the OAM node, which in turn may have obtained the first identifier and associative information in a corresponding manner as described in the preceding paragraph for the first network node 110a, i.e. by allocating it, such as selecting and/or forming it. The first identifier and associative information for the first network node 110a may e.g. be pre-allocated by said one or more nodes. The difference compared to above is that said node or nodes are here the source of the first identifier. The first identifier and its associative information may also in these embodiments be managed together with further first identifiers identifying also other network nodes and associative information of these further first identifiers. That is, also for these embodiments there may be centralized mapping.

Hence, to sum up, there may be one or more nodes, e.g. the OAM and/or IME node, for managing identifiers, such as manage associations or mapping between first identifiers and network nodes, including between the first identifier and the first network node 110a, by means of such associative information as discussed above. From this it is e.g. possible to, based on a first identifier, get information about some unique, and e.g. fix, identity or identifier of the first network node 110b, e.g. an address thereof, in the wireless communication network 100, and possibly also get information about when the first identifier validly identifies the network node it is associated with.

In some embodiments, one or more nodes, e.g. the IME node, manage associations, e.g. mapping, between first identifiers, possibly associated with time periods when these are valid, and other, second identifiers uniquely identifying network nodes and said network nodes in the wireless communication network 100, e.g. between a first identifier identifying the first network node 110a and a second identifier uniquely identifying the first network node 110a in the wireless communication network 100. Actions 210-211 below relate to how second identifiers can be used. One or more other nodes, e.g. the OAM node, may then manage associations, e.g. mapping, between the second identifiers and addresses of the network nodes being identified by the second identifiers. A second identifier may be a non-temporary, e.g. fix, identifier and that uniquely identifies the first network node 110a in the wireless communication network 100, which may be in contrast to the first identifier that may be obfuscated, e.g. by being temporary and/or more locally identifying the first network node 110a.

There may thus be one or more nodes, e.g. the OAM node and or the IME node, that provide and manage identifiers and associative information in a centralized way and can provide information upon request, e.g. based on a first identifier, possibly together with a time of receipt, and/or a second identifier. For example, and as will be discussed in some further detail below, a non-serving network node, e.g. the second network node, 110b that have received the first identifier in the uplink, may request information associated with the first identifier to thereby be able to uniquely recognize the first network node 110a as a neighboring node in the wireless communication network 100. This makes it possible to e.g. establish neighbor node relations and/or connection between these nodes as neighboring nodes.

An alternative to the above discussed centralized managing of first identifiers and associative information, is distributed management. This is not illustrated in the figure, but in this case in principle all relevant network nodes may keep updated on all relevant identifiers and associative information themselves, e.g. via a central node.

The first network node 110a may still, as above, inform one or more nodes, e.g. a central node such as the OAM node, about the and obtained first identifier and associative information, but this other node may then just route forward the information to other network nodes that this information should be relevant for and/or that may be interested in this information. Or, in case said other node, e.g. a central node such as the OAM node, has allocated the first identifier and may be considered the source of the first identifier and associative information, it may send this information not only to the first network node 110a, but also to other relevant network nodes that may have an interest in this information. Relevant network nodes may be potentially neighboring network nodes of the first network node 110a and/or potentially neighboring network nodes of the first network node 110a that are not already known and/or already established neighboring nodes.

However, in some embodiments, independent if they are based on centralized or distributed mapping as discussed above, information about the first identifier may be sent to also already known and/or already established neighboring nodes of the first network node 110a so that these, if they receive the first identifier in the uplink, can identify the first network node 110a as an already known neighboring network node. This way non-serving network nodes that correspond to already known and/or established neighboring network nodes to the first network node 110a, can avoid to perform some actions in the following, which actions are unnecessary if a non-serving network node is already a known neighboring node. These embodiments are also not illustrated in the figure Actions 206-207

The communication device 120 obtains the first identifier identifying the first network node 110a.

The communication device 120 typically obtains the first identifier by receiving it from the first network node 110a that thus sends it to the communication device 120, e.g. together with some associative information, such as information about a time period during which the first identifier may validly identify the first network node 110a and thus should be used. The first identifier may be sent as part of a message, request, command, instruction and/or configuration to the communication device 120, to make the communication device 120 to perform as described herein, see e.g. action 208 below.

In some embodiments, the communication device 120 obtains the first identifier internally, possibly with some associative information, such as information about a time period during which the first identifier may validly identify the first network node 110a. The communication device 120 may itself allocate, such as selecting and/or forming, the first identifier in a corresponding manner as was described above under action 203 regarding allocation by the first network node 110a. The communication device 120 may then inform the first network node 110a about the obtained first identifier and any associative information, and the first network node 110a may then, as already indicated above under action 203, obtain the first identifier, possibly with some associative information, by receiving it from the communication device 120

Action 208

The communication device 120 transmits, typically broadcasts, the obtained first identifier in the uplink so that one or more other, second network nodes, e.g. the second network node 110b, can receive the first identifier. This enables identification of the first radio network node 110a as neighboring the second radio network node 110b. In other words, the communication device 120 provides an uplink transmission comprising the first identifier.

In the embodiments where the first identifier is a random access sequence, as discussed above, the communication device 120 may simply just transmit this sequence, and may do this as normally is done when transmitting a random access sequence, but without performing any other steps of a complete random access procedure. Similarly, any node, e.g. the second network node 110b, that receives a first identifier in the form of a random access sequence, may receive and identify the random access sequence as normally done for a random access sequences, although this time it will be interpreted as a first identifier. The second network node 110b should then perform as described for embodiments herein, but avoid performing any further steps of a random access procedure for the communication device 120.

The resources and signaling used by the communication device 120 to transmit the first identifier may be fixed during a certain time period that may be named a training period, which may be a time period during which all nodes in a certain area neighboring the first network node 110a are configured to monitor for transmissions with first identifiers. The training period may be predetermined and/or set or determined by the OAM node, e.g. in relation to when a first identifier or first identifiers will be transmitted and/or one or more time periods when these first identifiers will be validly identifying network nodes. The training period may concern a large set of nodes, for example in an area corresponding to a city or a part of a city. During the training period, these nodes should listening for uplink transmissions with first identifiers and receive such first identifier, if any. The training period may be a time duration in a certain operational phase of these nodes.

In some embodiments there may certain uplink transmissions, and/or e.g. a set of first identifiers, e.g. in the form of sequences, random access sequences or similar, that may be pre-configured and/or predetermined, such as reserved and fixed in a standard. These uplink transmissions and/or first identifiers may always be identifiable and radio network nodes, e.g. the second network node 110b, may always be monitoring, such as listening, for these uplink transmissions and/or first identifiers. i.e. not only during certain training periods. This allows an uplink transmission comprising a first identifier to be carried out at, in principle, at any time and the first identifier be received and identified as such by neighboring radio network nodes, e.g. the second network node 120b.

Action 209

The second network node 110b may associate the reception of the first identifier in action 208 with a time of receipt, i.e. the time when the first identifier was received. The time of receipt may be considered to be the same as a time when the first identifier was sent, i.e. the transmission time. The second network node 110b may e.g. store the received first identifier together with the time of receipt.

This action may be of particular interest for embodiments where the first identifier has been allocated for temporary use and thus is associated with a time period during which the first identifier validly identifies the first network node 110a. For these embodiments, the time of receipt may be needed to be able to use the first identifier, e.g. by utilizing, as described elsewhere herein, how the first identifier and an associated time period map to a second identifier identifying the first network node 110a, or an address of the first network node 110b, in the wireless communication network 100.

Action 210

In a process of retrieving the address of the first network node based on the received first identifier, and possible also its time of receipt, the second network node 110b may first obtain a second identifier by sending a request for such to another node or nodes, e.g. the IME node. The request may be based on, e.g. comprising the first identifier and its time of receipt. The second identifier may be a Base Station ID (BSID) of the first network node 110a. The second identifier is thus also identifying the first network node 110a, but may not be obfuscated as the first identifier may be. As already mentioned above, the second identifier may be a non-temporary, e.g. fix, identifier and that uniquely identifies the first network node 110a in the wireless communication network 100. One or more nodes, e.g. the IME, may manage mapping between second identifiers and first identifiers, where the first identifiers are possibly also associated with time periods when they are valid, as discussed above.

Action 211

Upon receiving the request in action 210, said one or more nodes, e.g. the IME, responds by sending the second identifier back to the second network node 110b that receives it.

Action 212

Based on either the received first identifier and e.g. any time period associated with it, and/or based on the received second identifier, the second network node 110b may request an address of the first network node 110a by sending a request for the address to one or more nodes that are known in advance, e.g. that are known to managing identifiers and associative information, e.g. the OAM node. The address may be a Transport Network Layer (TNL) address of the first network node 110a. The request may be sent as a TNL address request message.

Action 213

In some embodiments, a node, e.g. the OAM node, receiving the request in action 210, may in turn send a request for the address to the first network node 110a.

This may be the case if the OAM node does not already know, or have direct access, to the address requested in action 210, e.g. a TNL address. For example in case the OAM node have mapped the first identifier to another address than a TNL address, or to some other identifier, such as a secnd identifier as discussed above. The mapping may be used to contact the first network node 110a and request the TNL address from it.

In some embodiments, the OAM node may in principle just forward the address request from action 212. If the request is based on the second identifier, it is simply forwarded to the network node identified by the second identifier. If the request instead is based on the first identifier, and e.g. including the time of receipt of the first identifier, the request can instead be forwarded to network nodes that potentially are the network nodes being identified by the first identifier, e.g. to all network nodes that are in an area sufficiently close to the second network node 110b that sent the request in action 212, which then of course would include the first network node 110a. Only the network node that has a matching first identifier that is valid, e.g. with respect to the time of receipt of the first identifier, will respond with its address, e.g. the first network node 110a.

Action 214

In embodiments when the first node 110a received the request in action 213, the first network node 110a responds by sending back the requested address, i.e. the address of the first network node 110b.

Action 215

One or more nodes, e.g. the OAM node, that received the request in action 210, responds to it by sending the address of the first network node 110a to the second network node 110b. The address may be sent as a TNL address response message.

Action 216

When the second network node 110b has received the address of the first network node 110a, it can e.g. establish a neighbor node relationship with it and/or contact the first network node 110a, e.g. send a request for interface setup. This could e.g. be accomplished by sending a, possible enhanced, X2 setup request message to the first network node 110a.

Action 217

Upon receiving the request for interface setup in action 216, the first network node 110a may respond and acknowledge this by e.g. sending an interface response message to the second network node 110*b*. This message may eg. be an X2 request response message. This will eventually result in that a communication interface, e.g. X2, is set up and can be used for communication between the first network node 110*a* and the second network node 110*b*, and that neighbor node relations, or similar, reflecting this can be established.

Some advantages provided by embodiments herein include: That nodes in the wireless communication network 100, e.g. a NR or 5G network, are enabled to establish neighbor node relations without having to rely on "always on" downlink signaling, i.e. it can be done within an "ultra-lean" design principle. That obfuscated first identifiers may be used in the uplink, which makes it possible to e.g. prevent so called Over-the-Top-Players (OTP) to uniquely identify network nodes within the wireless communication network, and thereby also the position of these nodes.

Figure 3:
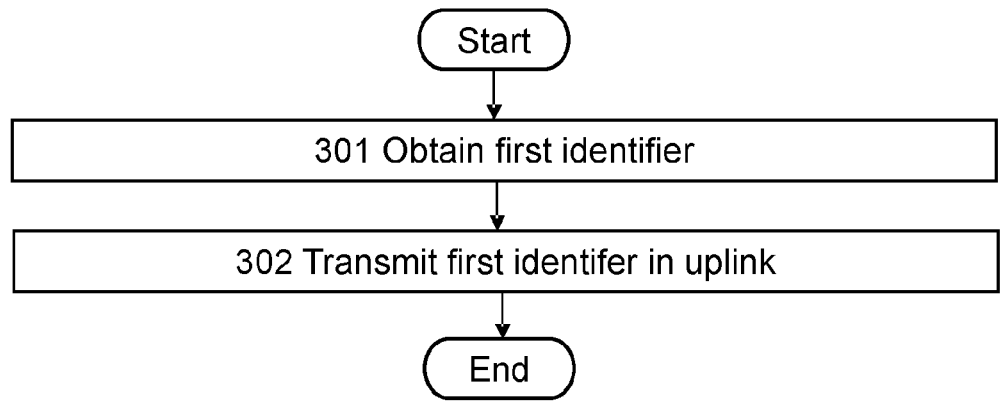
FIG. 3 is a flowchart schematically illustrating embodiments of a first method according to embodiments herein.

FIG. 3 is a flow chart schematically illustrating embodiments of a first method, performed by a communication device, e.g. the communication device 120, for supporting identification of one or more neighboring network nodes, e.g. the first network node 110*a* and the second network node 110*b*, comprised in a wireless communication network, e.g. the wireless communication network 100. The communication device 120 is associated with a communicative connection to the first network node 110*a*, e.g. is served by the first network node 110*a*.

The first method comprises the following actions, which actions may be taken in any suitable order and/or be carried out fully or partly overlapping in time when this is possible and suitable.

Action 301

The communication device 120 obtains a first identifier identifying the first network node 110*a*.

The first identifier may be allocated for temporary use. Further, the first identifier may be a random access sequence Moreover, the first identifier may be an identifier allocated specifically to be transmitted in the uplink by one or more communication devices, including the communication device 120, in order to enable said one or more second network nodes, including the second network node 120*b*, to receive the first identifier and thereby enable said identification of the first network node 110*a* as neighboring said one or more second network nodes, e.g. the second network node 110*b*.

In some embodiments, the first identifier is obtained by being received from the first network node 110*a*.

This action may fully or partly correspond to action 207 as described above.

Action 302

The communication device 120 transmits the obtained first identifier in an uplink so that the first identifier is receivable by one or more other, second network nodes, e.g. the second network node 110*b*, whereby receipt of the first identifier by the second network node 110*b* enables identification of the first radio network node 110*a* as neighboring said second radio network node 110*b*.

The first identifier may be transmitted in the uplink during a certain time period, e.g. a training period, when said one or more second network nodes, including the second network node 110*b*, are configured to specifically listen for such identifier with the purpose of identifying neighboring network radio nodes.

This action may fully or partly correspond to action 208 as described above.

In some embodiments, action 301 and/or action 302 are carried out in response to that the communication device 120 has informed the first network node 110*a* about a reference signal that the communication device 120 has received from at least one of said one or more second network nodes, e.g. the second network node 110*b*, but which reference signal was insufficient to identify the second network node 110*b*.

This may fully or partly correspond to actions 201-202 and 207-208 as described above.

Figure 4:
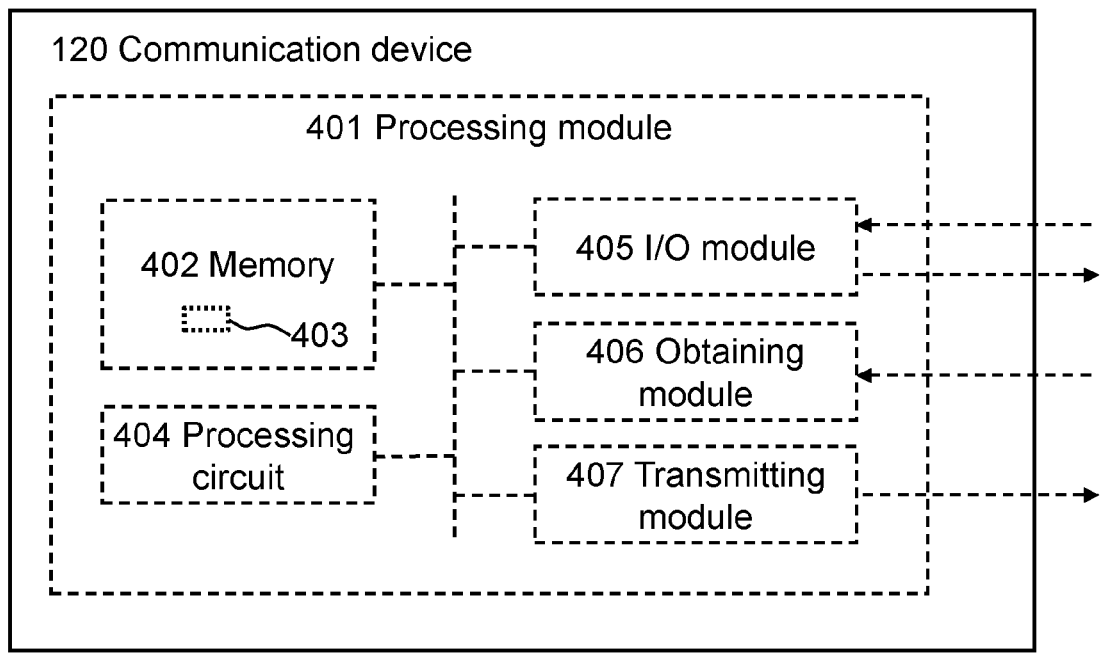
FIG. 4 is a functional block diagram for illustrating embodiments of an communication device according to embodiments herein and how it can be configured to carry out the first method.

FIG. 4 is a schematic block diagram for illustrating embodiments of how the communication device 120 may be configured to perform the first method and actions discussed above in connection with FIG. 3.

Hence, the communication device 120 is for supporting identification of one or more neighboring network nodes, e.g. the first network node 110*a* and the second network node 110*b*, comprised in a wireless communication network, e.g. the wireless communication network 100. The communication device 120 is associated with a communicative connection to the first network node 110*a*.

The communication device 120 may comprise a processing module 401, such as a means, one or more hardware modules, including e.g. one or more processors, and/or one or more software modules for performing said methods and/or actions.

The communication device 120 may further comprise a memory 402 that may comprise, such as contain or store, a computer program 403. The computer program 403 comprises 'instructions' or 'code' directly or indirectly executable by the communication device 120 so that it performs said methods and/or actions. The memory 402 may comprise one or more memory units and may further be arranged to store data, such as configurations and/or applications involved in or for performing functions and actions of embodiments herein.

Moreover, the communication device 120 may comprise a processing circuit 404 as an exemplifying hardware module and may comprise or correspond to one or more processors. In some embodiments, the processing module 401 may comprise, e.g. 'is embodied in the form of' or 'realized by' the processing circuit 404. In these embodiments, the memory 402 may comprise the computer program 403 executable by the processing circuit 404, whereby the communication device 120 is operative, or configured, to perform said first method and/or actions thereof.

Typically the communication device 120, e.g. the processing module 401, comprises an Input/Output (I/O) module 405, configured to be involved in, e.g. by performing, any communication to and/or from other units and/or nodes, such as sending and/or receiving information to and/or from other nodes or devices. The I/O module 405 may be exemplified by an obtaining, e.g. receiving, module and/or a providing, e.g. sending, module, when applicable.

Further, in some embodiments, the communication device 120, e.g. the processing module 401, comprises one or more of an obtaining module 406 and a transmitting module 407, as exemplifying hardware and/or software module(s). These modules may be fully or partly implemented by the processing circuit 404.

The communication device 120, and/or the processing module 401, and/or the processing circuit 404, and/or the I/O module 405, and/or the obtaining module 406 are operative, or configured, to obtain the first identifier identifying the first network node 110*a*, in some embodiments to obtain the first identifier by receiving it from the first network node 110*a*.

In some embodiments, the communication device 120, and/or the processing module 401, and/or the processing circuit 404, and/or the I/O module 405, and/or the obtaining module 406 are further operative, or configured, to obtain the first identifier in response to said message received by the communication device 120 from the first network node 110a.

Also, in some embodiments, the communication device 120, and/or the processing module 401, and/or the processing circuit 404, and/or the I/O module 405, and/or the obtaining module 406 are further operative, or configured, to obtain the first identifier in response to that the communication device 120 has informed the first network node 110a about said reference signal that the communication device 120 has received from at least one of said one or more second network nodes, e.g. the second network node 110b, but which reference signal was insufficient to identify the second network node 110b.

Moreover, the communication device 120, and/or the processing module 401, and/or the processing circuit 404, and/or the transmitting module 407, are operative, or configured to transmit the obtained first identifier in the uplink so that the first identifier is receivable by said one or more other, second network nodes, including the second network node 110b.

Further, in some embodiments, the communication device 120, and/or the processing module 401, and/or the processing circuit 404, and/or the I/O module 405, and/or the transmitting module 407 are further operative, or configured, to obtain the first identifier in response to that the communication device 120 has informed the first network node 110a about said reference signal that the communication device 120 has received from at least one of said one or more second network nodes, e.g. the second network node 110b, but which reference signal was insufficient to identify the second network node 110b.

Moreover, in some embodiments, the communication device 120, and/or the processing module 401, and/or the processing circuit 404, and/or the I/O module 405, and/or the transmitting module 407 are further operative, or configured, to transit the first identifier in the uplink during said certain time period when the one or more second network nodes, including the second network node 110b, are configured to specifically listen for such identifier with the purpose of identifying neighboring network radio nodes.

Figure 5:
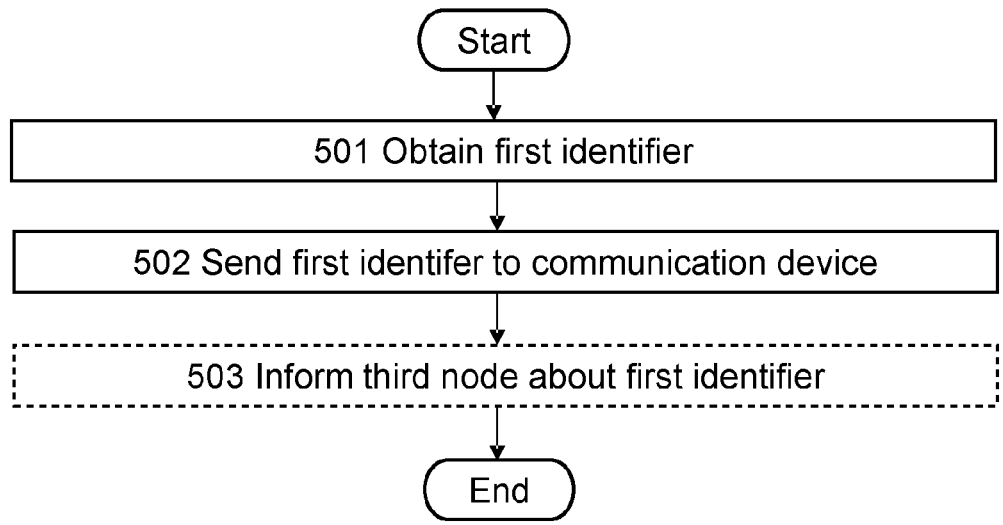
FIG. 5 is a flowchart schematically illustrating embodiments of a second method according to embodiments herein.

FIG. 5 is a flow chart schematically illustrating embodiments of a second method, performed by a first network node, e.g. the first network node 110a, for supporting identification of one or more neighboring network nodes, e.g. the first network node 110a and the second network node 110b, comprised in a wireless communication network, e.g. the wireless communication network 100. The first network node 110a is associated with a communicative connection to a communication device, e.g. the communication device 120. The communication device 120 may e.g.be served by the first network node 110a.

The second method comprises the following actions, which actions may be taken in any suitable order and/or be carried out fully or partly overlapping in time when this is possible and suitable.

Action 501

The first network node 110a obtains a first identifier identifying the first network node 110a.

The first identifier may be allocated for temporary use. Further, the first identifier may be a random access sequence.

Moreover, the first identifier may be an identifier allocated specifically to be transmitted in the uplink by one or more communication devices, including the communication device 120, in order to enable said one or more second network nodes, including the second network node 120b, to receive the first identifier and thereby enable said identification of the first network node 110a as neighboring said one or more second network nodes, e.g. the second network node 110b.

In some embodiments, the first identifier is obtained by being received from one or more third nodes, which one or more third nodes manages mapping between:

the first identifier and an address of the first network node 110a in the wireless communication network 100, and/or the first identifier and a second identifier uniquely identifying the first network node 110a in the wireless communication network 100.

The one or more third nodes may e.g. be one or more of: the first central node 130, the second central node 131, the external node 201, the computer cloud 202, and may e.g. be a OAM node and/or IME node.

This action may fully or partly correspond to action 203, 204a, 205a, 206 as described above.

Action 502

The first network node 110a sends the obtained first identifier to the communication device 120, the first identifier to be transmitted by the communication device 120 in the uplink so that the first identifier is receivable by one or more other, second network nodes, e.g. the second network node 110b, whereby receipt of the first identifier by the second network node 110b enables identification of the first radio network node 110a as neighboring said second radio network node 110b.

In some embodiments, the first identifier is to be transmitted in the uplink during a certain time period, e.g. a training period, when said one or more second network nodes, including the second network node 110b, are configured to specifically listen for such identifier with the purpose of identifying neighboring network radio nodes.

This action may fully or partly correspond to action 206 as described above.

In some embodiments, action 501 and/or action 502 are carried out in response to that the communication device 120 has informed the first network node 110a about a reference signal that the communication device 120 has received from at least one of said one or more second network nodes, e.g. the second network node 110b, but which reference signal was insufficient to identify the second network node 110b.

This may fully or partly correspond to actions 201-203 as described above.

Action 503

In some embodiments, the first network node 110a informs one or more third nodes about the obtained first identifier, which one or more third nodes manages mapping between:

the first identifier and an address of the first network node 110a in the wireless communication network 100, and/or the first identifier and a second identifier uniquely identifying the first network node 110a in the wireless communication network 100.

The one or more third nodes may e.g. be one or more of: the first central node 130, the second central node 131, the external node 201, the computer cloud 202, the second network node 110b, and may e.g. be a OAM node and/or IME node.

This action may fully or partly correspond to actions 204a-b, 205a-b as described above.

Figure 6:
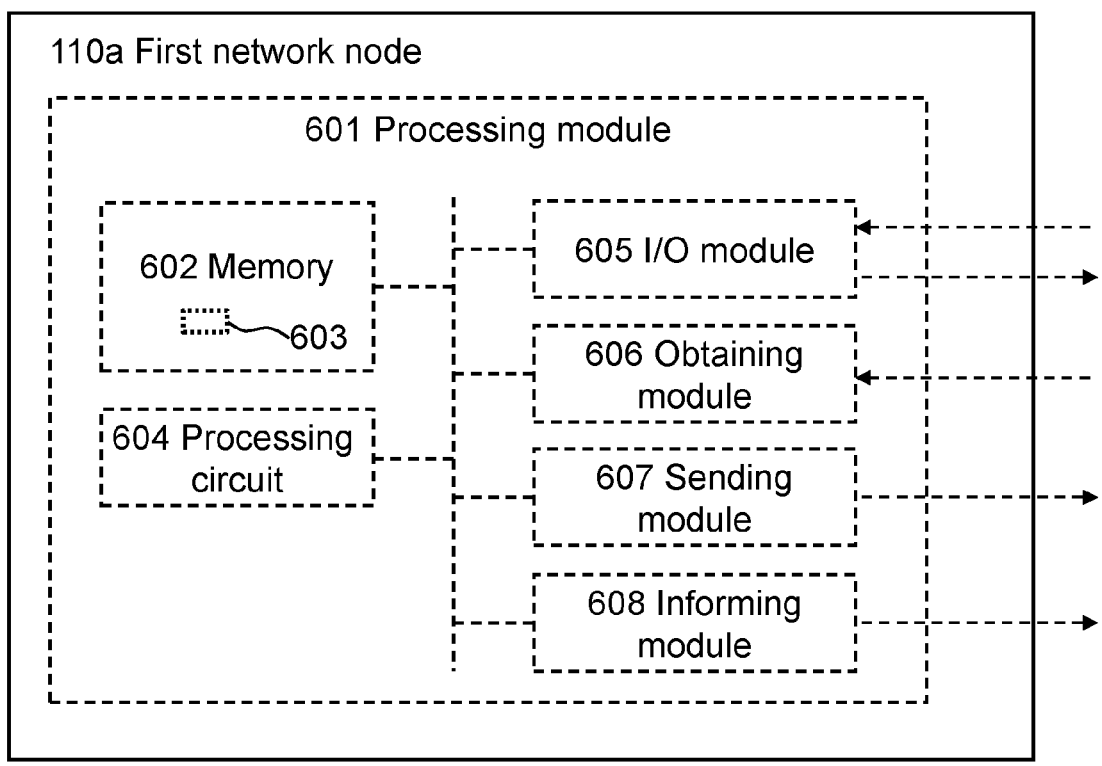
FIG. 6 is a functional block diagram for illustrating embodiments of first network node according to embodiments herein and how it can be configured to carry out the second method.

FIG. 6 is a schematic block diagram for illustrating embodiments of how the first network node 110a may be configured to perform the second method and actions discussed above in connection with FIG. 5.

Hence, the first network node 110a is for supporting identification of one or more neighboring network nodes, e.g. the first network node 110a and the second network node 110b, comprised in a wireless communication network, e.g. the wireless communication network 100. The is the first network node 110a is associated with a communicative connection to a communication device, e.g. the communication device 120.

The first network node 110a may comprise a processing module 601, such as a means, one or more hardware modules, including e.g. one or more processors, and/or one or more software modules for performing said methods and/or actions.

The first network node 110a may further comprise a memory 602 that may comprise, such as contain or store, a computer program 603. The computer program 603 comprises 'instructions' or 'code' directly or indirectly executable by the first network node 110a so that it performs said methods and/or actions. The memory 602 may comprise one or more memory units and may further be arranged to store data, such as configurations and/or applications involved in or for performing functions and actions of embodiments herein.

Moreover, the first network node 110a may comprise a processing circuit 604 as an exemplifying hardware module and may comprise or correspond to one or more processors. In some embodiments, the processing module 601 may comprise, e.g. 'is embodied in the form of' or 'realized by' the processing circuit 604. In these embodiments, the memory 602 may comprise the computer program 603 executable by the processing circuit 604, whereby the first network node 110a is operative, or configured, to perform said first method and/or actions thereof.

Typically the first network node 110a, e.g. the processing module 601, comprises an Input/Output (I/O) module 605, configured to be involved in, e.g. by performing, any communication to and/or from other units and/or nodes, such as sending and/or receiving information to and/or from other nodes or devices. The I/O module 605 may be exemplified by an obtaining, e.g. receiving, module and/or a providing, e.g. sending, module, when applicable.

Further, in some embodiments, the first network node 110a, e.g. the processing module 601, comprises one or more of an obtaining module 606, a sending module 607, and an informing module 608 as exemplifying hardware and/or software module(s). These modules may be fully or partly implemented by the processing circuit 604.

The first network node 110a, and/or the processing module 601, and/or the processing circuit 604, and/or the I/O module 605, and/or the obtaining module 606 are operative, or configured, to obtain the first identifier identifying the first network node 110a.

In some embodiments, first network node 110a, and/or the processing module 601, and/or the processing circuit 604, and/or the I/O module 605, and/or the obtaining module 606 are further operative, or configured, to obtain the first identifier by receiving it from said one or more third nodes, which one or more third nodes manages mapping between the first identifier and an address of the first network node 110a in the wireless communication network 100, and/or mapping between the first identifier and a second identifier uniquely identifying the first network node 110a in the wireless communication network 100.

Moreover, in some embodiments, first network node 110a, and/or the processing module 601, and/or the processing circuit 604, and/or the I/O module 605, and/or the obtaining module 606 are further operative, or configured, to obtain the first identifier in response to that the communication device 120 has informed the first network node 110a about a reference signal that the communication device 120 has received from at least one of said one or more second network nodes 110b but which reference signal was insufficient to identify said at least one of said one or more second network nodes 110b.

The first network node 110a, and/or the processing module 601, and/or the processing circuit 604, and/or the I/O module 605, and/or the sending module 607, are operative, or configured, to send the obtained first identifier to the communication device 120, the first identifier to be transmitted by the communication device 120 in the uplink so that the first identifier is receivable by one or more other, second network nodes, including the second network node 110b, whereby receipt of the first identifier by the second network node 110b enables identification of the first radio network node 110a as neighboring said second radio network node 110b.

In some embodiments, the first network node 110a, and/or the processing module 601, and/or the processing circuit 604, and/or the I/O module 605, and/or the sending module 607, are operative, or configured, to send the first identifier in response to that the communication device 120 has informed the first network node 110a about a reference signal that the communication device 120 has received from at least one of said one or more second network nodes 110b but which reference signal was insufficient to identify said at least one of said one or more second network nodes 110b.

Furthermore, in some embodiments, the first network node 110a, and/or the processing module 601, and/or the processing circuit 604, and/or the I/O module 605, and/or the informing module 608, are operative, or configured to inform said one or more third nodes about the obtained first identifier, which one or more third nodes manages mapping between the first identifier and an address of the first network node 110a in the wireless communication network 100, and/or mapping between the first identifier and a second identifier uniquely identifying the first network node 110a in the wireless communication network 100.

Figure 7:
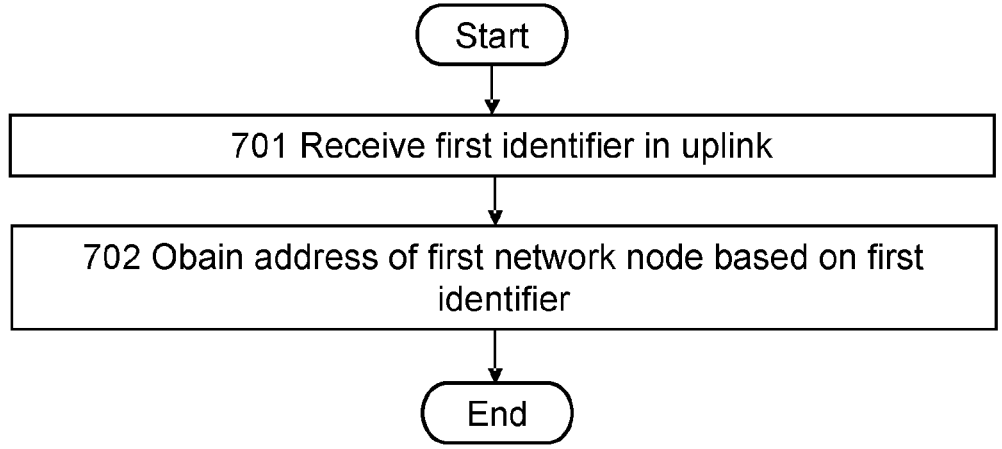
FIG. 7 is a flowchart schematically illustrating embodiments of a third method according to embodiments herein.

FIG. 7 is a flow chart schematically illustrating embodiments of a third method, performed by a second network node, e.g. the second network node 110b, for supporting identification of one or more neighboring network nodes, e.g. the first network node 110a and the second network node 110b, comprised in a wireless communication network, e.g. the wireless communication network 100.

The third method comprises the following actions, which actions may be taken in any suitable order and/or be carried out fully or partly overlapping in time when this is possible and suitable.

Action 701

The second network node 110b receives, from a communication device 120, e.g. the communication device 120, a first identifier transmitted by the communication device 120 in the uplink. The first identifier identifies a first network node, e.g. the first network node 110a, associated with a communicative connection to the communication device 120, whereby the first network node 110a is identifiable as neighboring the second network node 110b. The communication device 120 may e.g.be served by the first network node 110a.

The first identifier may be allocated for temporary use and the address may be obtained also based on when the second network node 110b received the first identifier. Further, the first identifier may be a random access sequence.

Moreover, the first identifier may be an identifier allocated specifically to be transmitted in the uplink by one or more communication devices, including the communication device 120, in order to enable said one or more second network nodes, including the second network node 120b, to receive the first identifier and thereby enable said identification of the first network node 110a as neighboring said one or more second network nodes, e.g. the second network node 110b.

The first identifier may be received in the uplink during a certain time period when the second network node 110b is configured to specifically listen for such identifier with the purpose of identifying neighboring network radio nodes.

This action may fully or partly correspond to action 208 as described above.

Action 702

The second network node 110b obtains, based on the first identifier, an address of the first network node 110a in the wireless communication network 100 and/or a second identifier uniquely identifying the first network node 110a in the wireless communication network 100.

The second network node 110b obtaining the address may comprise that the second network node 110b sends an address request with the first identifier to one or more third nodes, e.g. the first central node 130, the secnd central node 131, the external node and/or the computer cloud, which one or more third nodes manages mapping between the first identifier and an address of the first network node 110a in the wireless communication network 100, and/or mapping between the first identifier and a second identifier uniquely identifying the first network node 110a in the wireless communication network 100.

This action may fully or partly correspond to actions 210-215 as described above.

Figure 8:
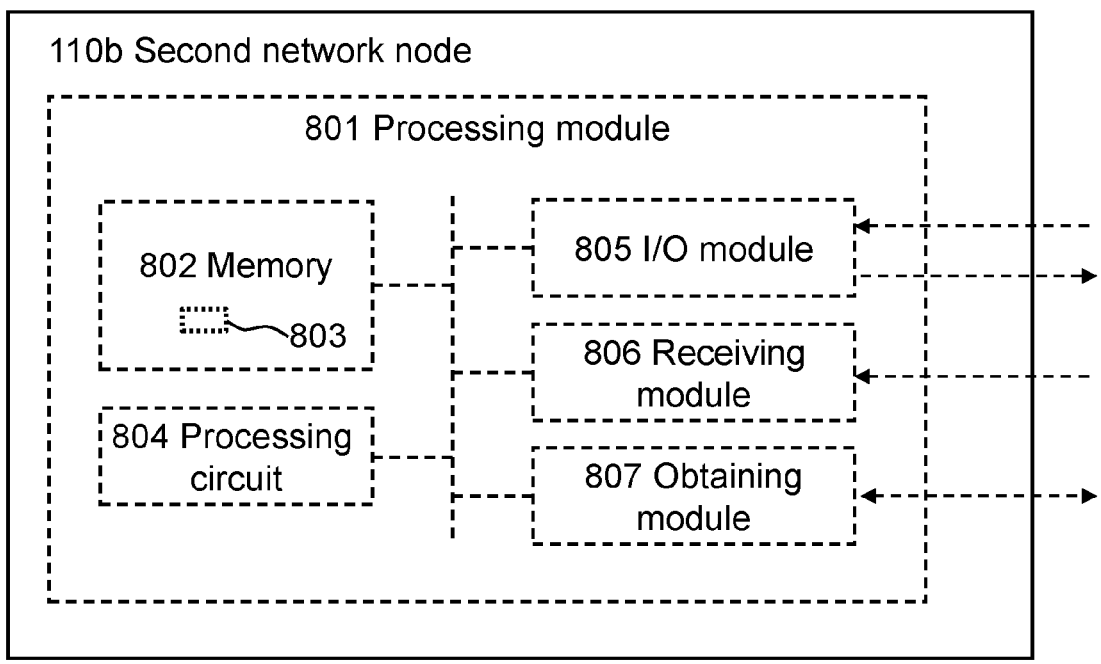
FIG. 8 is a functional block diagram for illustrating embodiments of a second network node according to embodiments herein and how it can be configured to carry out the third method.

FIG. 8 is a schematic block diagram for illustrating embodiments of how the second network node 110b may be configured to perform the third method and actions discussed above in connection with FIG. 7.

Hence, the second network node 110b is for supporting identification of one or more neighboring network nodes, e.g. the first network node 110a and the second network node 110b, comprised in a wireless communication network, e.g. the wireless communication network 100.

The second network node 110b may comprise a processing module 801, such as a means, one or more hardware modules, including e.g. one or more processors, and/or one or more software modules for performing said methods and/or actions.

The second network node 110b may further comprise a memory 802 that may comprise, such as contain or store, a computer program 803. The computer program 803 comprises 'instructions' or 'code' directly or indirectly executable by the second network node 110b so that it performs said methods and/or actions. The memory 802 may comprise one or more memory units and may further be arranged to store data, such as configurations and/or applications involved in or for performing functions and actions of embodiments herein.

Moreover, the second network node 110b may comprise a processing circuit 804 as an exemplifying hardware module and may comprise or correspond to one or more processors. In some embodiments, the processing module 801 may comprise, e.g. 'is embodied in the form of' or 'realized by' the processing circuit 804. In these embodiments, the memory 802 may comprise the computer program 803 executable by the processing circuit 804, whereby the second network node 110b is operative, or configured, to perform said third method and/or actions thereof.

Typically the second network node 110b, e.g. the processing module 801, comprises an Input/Output (I/O) module 805, configured to be involved in, e.g. by performing, any communication to and/or from other units and/or nodes, such as sending and/or receiving information to and/or from other nodes or devices. The I/O module 805 may be exemplified by an obtaining, e.g. receiving, module and/or a providing, e.g. sending, module, when applicable.

Further, in some embodiments, the second network node 110b, e.g. the processing module 801, comprises one or more of a receiving module 806 and an obtaining module 807 as exemplifying hardware and/or software module(s). These modules may be fully or partly implemented by the processing circuit 804.

The second network node 110b, and/or the processing module 801, and/or the processing circuit 804, and/or the I/O module 805, and/or the receiving module 806 are operative, or configured, to receive, from the communication device 120, the first identifier transmitted by the communication device 120 in the uplink, said first identifier identifying the first network node 110a associated with said communicative connection to the communication device 120, whereby the first network node 110a is identifiable as neighboring the second network node 110b.

In some embodiments, the second network node 110b, and/or the processing module 801, and/or the processing circuit 804, and/or the I/O module 805, and/or the receiving module 806 are operative, or configured, to receive the first identifier in the uplink during a certain time period when the second network node 110b is configured to specifically listen for such identifier with the purpose of identifying neighboring network nodes.

Further, the second network node 110b, and/or the processing module 801, and/or the processing circuit 804, and/or the I/O module 805, and/or the obtaining module 807 are operative, or configured, to obtain, based on the first identifier, said address of the first network node 110a in the wireless communication network 100 and/or said second identifier uniquely identifying the first network node 110a in the wireless communication network 100.

In some embodiments, the second network node 110b, and/or the processing module 801, and/or the processing circuit 804, and/or the I/O module 805, and/or the obtaining module 807 are operative, or configured, to obtain the address also based on when the second network node 110b received the first identifier.

Moreover, in some embodiments, the second network node 110b, and/or the processing module 801, and/or the processing circuit 804, and/or the I/O module 805, and/or the obtaining module 807 being operative, or configured to obtain the address may comprise that they are operative, or configured to send an address request with the first identifier to said one or more third nodes, which one or more third nodes manages mapping between the first identifier and an address of the first network node 110a in the wireless communication network 100, and/or mapping between the first identifier and a second identifier uniquely identifying the first network node 110a in the wireless communication network 100.

Figure 9:
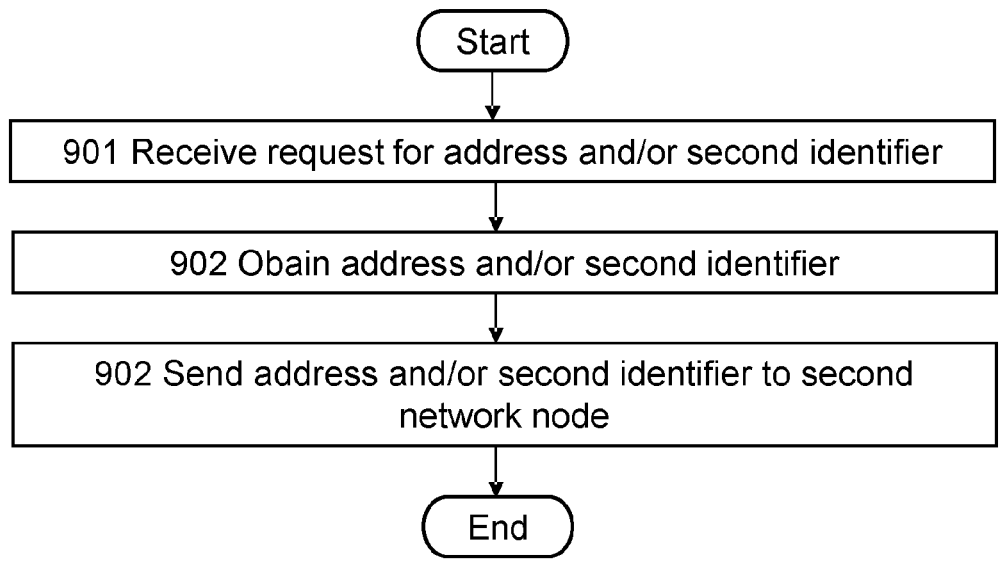
FIG. 9 is a flowchart schematically illustrating embodiments of a fourth method according to embodiments herein.

FIG. 9 is a flow chart schematically illustrating embodiments of a fourth method, performed by an arrangement, for supporting identification of one or more neighboring network nodes, e.g. the first network node 110a and the second network node 110b, comprised in a wireless communication network, e.g. the wireless communication network 100. The arrangement may correspond to one or more nodes and may e.g. be one or more of: the first central node 130, the second central node 131, the external node 201, the computer cloud 202, the first network node 110*a*, the second network node 110*b*, and may e.g. be a OAM node and/or IME node. The arrangement is configured to manage mapping between a first identifier and an address of the first network node 110*a* in the wireless communication network 100, and/or mapping between the first identifier and a second identifier uniquely identifying the first network node 110*a* in the wireless communication network 100.

The fourth method comprises the following actions, which actions may be taken in any suitable order and/or be carried out fully or partly overlapping in time when this is possible and suitable.

Action 901

The arrangement receives, from a second network node, e.g. the second network node 110*b*, a request requesting the address and/or the second identifier, and comprising the first identifier after it has been received in the uplink by the second network node 110*b* when the first identifier was transmitted in the uplink by a communication device, e.g. the communication device 120, associated with a communicative connection to the first network node 110*a*.

In some embodiments the first identifier is allocated for temporary use, and said request additionally comprises a time of receipt of the first identifier by the second network node 110*b*.

The first identifier may be a random access sequence.

Moreover, the first identifier may be an identifier allocated specifically to be transmitted in the uplink by one or more communication devices, including the communication device 120, in order to enable said one or more second network nodes, including the second network node 120*b*, to receive the first identifier and thereby enable said identification of the first network node 110*a* as neighboring said one or more second network nodes, e.g. the second network node 110*b*.

The first identifier may have been received in the uplink the second network node 110*b* during a certain time period when the second network node 110*b* was configured to specifically listen for such identifier with the purpose of identifying neighboring network radio nodes.

This action may fully or partly correspond to actions 210, 212 as described above.

Action 902

The arrangement obtains, in response to the request and based on the first identifier and the mapping, the address and/or the second identifier. In some embodiments, the address and/or the second identifier is obtained also based on said a time of receipt of the first identifier by the second network node 110*b*.

This action may fully or partly correspond to actions 213-214 as described above.

Action 903

The arrangement sends, to the second network node 110*b*, the obtained address and/or the obtained second identifier.

This action may fully or partly correspond to actions 211, 215 as described above.

Figure 10:
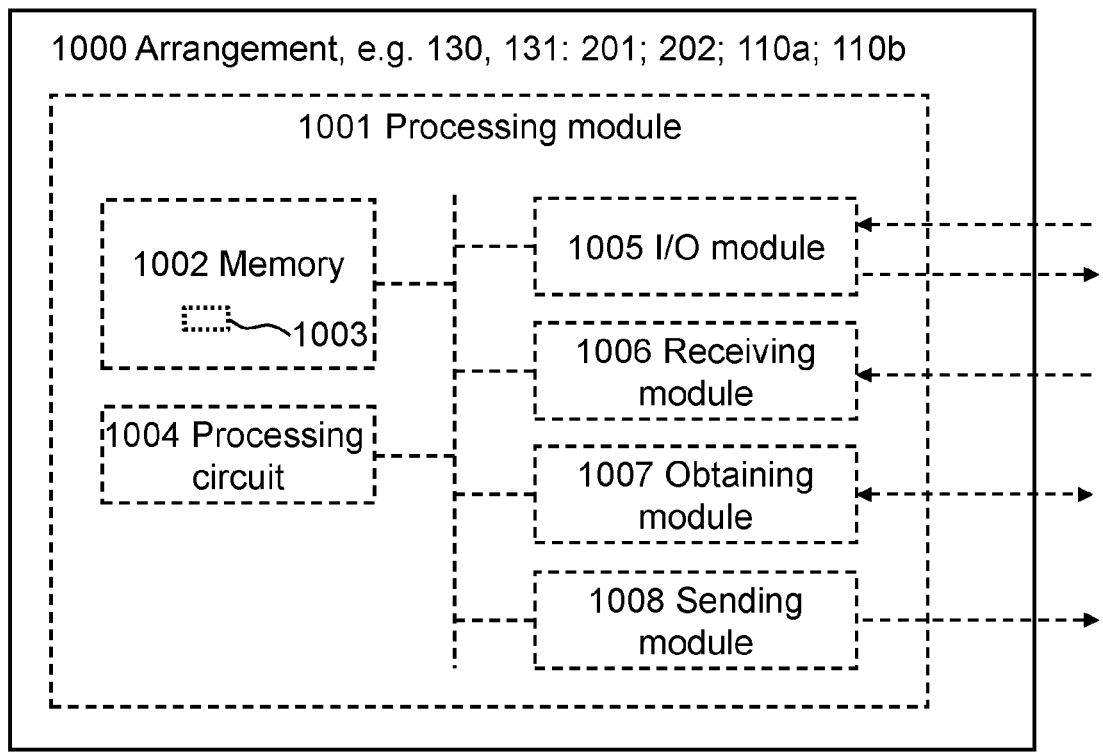
FIG. 10 is a functional block diagram for illustrating embodiments of an arrangement according to embodiments herein and how it can be configured to carry out the fourth method.

FIG. 10 is a schematic block diagram for illustrating embodiments of how an arrangement 1000 may be configured to perform the fourth method and actions discussed above in connection with FIG. 9. The arrangement 1000 corresponds to the arrangement discussed above in connection with FIG. 9. Hence, as already indicated above, the arrangement 1000 may correspond to one or more nodes and may e.g. be one or more of: the first central node 130, the second central node 131, the external node 201, the computer cloud 202, the first network node 110*a*, the second network node 110*b*, and may e.g. be a OAM node and/or IME node.

Hence, the arrangement 1000 is for supporting identification of one or more neighboring network nodes, e.g. the first network node 110*a* and the second network node 110*b*, comprised in the wireless communication network 100. The arrangement 1000 is configured to manage said mapping between the first identifier and the address of the first network node 110*a* in the wireless communication network 100, and/or mapping between the first identifier and a second identifier uniquely identifying the first network node 110*a* in the wireless communication network 100.

The arrangement 1000 may comprise a processing module 1001, such as a means, one or more hardware modules, including e.g. one or more processors, and/or one or more software modules for performing said methods and/or actions.

The arrangement 1000 may further comprise a memory 1002 that may comprise, such as contain or store, a computer program 1003. The computer program 1003 comprises 'instructions' or 'code' directly or indirectly executable by the arrangement 1000 so that it performs said methods and/or actions. The memory 1002 may comprise one or more memory units and may further be arranged to store data, such as configurations and/or applications involved in or for performing functions and actions of embodiments herein.

Moreover, the arrangement 1000 may comprise a processing circuit 1004 as an exemplifying hardware module and may comprise or correspond to one or more processors. In some embodiments, the processing module 1001 may comprise, e.g. 'is embodied in the form of' or 'realized by' the processing circuit 1004. In these embodiments, the memory 1002 may comprise the computer program 1003 executable by the processing circuit 1004, whereby the arrangement 1000 is operative, or configured, to perform said fourth method and/or actions thereof.

Typically the arrangement 1000, e.g. the processing module 1001, comprises an Input/Output (I/O) module 1005, configured to be involved in, e.g. by performing, any communication to and/or from other units and/or nodes, such as sending and/or receiving information to and/or from other nodes or devices. The I/O module 1005 may be exemplified by an obtaining, e.g. receiving, module and/or a providing, e.g. sending, module, when applicable.

Further, in some embodiments, the arrangement 1000, e.g. the processing module 1001, comprises one or more of a receiving module 1006, an obtaining module 1007 and a sending module 1008 as exemplifying hardware and/or software module(s). These modules may be fully or partly implemented by the processing circuit 1004.

The arrangement 1000, and/or the processing module 1001, and/or the processing circuit 1004, and/or the I/O module 1005, and/or the receiving module 1006 are operative, or configured, to receive, from the second network node 110*b*, said request requesting the address and/or the second identifier, and comprising the first identifier after it has been received in the uplink by the second network node 110*b* when the first identifier was transmitted in the uplink by the communication device 120 associated with said communicative connection to the first network node 110*a*.

The arrangement 1000, and/or the processing module 1001, and/or the processing circuit 1004, and/or the I/O module 1005, and/or the obtaining module 1007 are operative, or configured, to obtain, in response to the request and based on the first identifier and the mapping, the address and/or the second identifier.

In some embodiments where the first identifier is allocated for temporary use, and said request additionally comprises a time of receipt of the first identifier by the second network node 110b, the arrangement 1000, and/or the processing module 1001, and/or the processing circuit 1004, and/or the I/O module 1005, and/or the obtaining module 1007 are further operative, or configured, to obtain the address and/or the second identifier also based on the time of receipt.

The arrangement 1000, and/or the processing module 1001, and/or the processing circuit 1004, and/or the I/O module 1005, and/or the sending module 1008 are operative, or configured, to send, to the second network node 110b, the address and/or the second identifier.

Figure 11A:
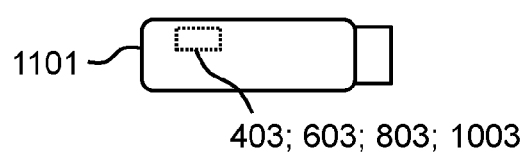
FIGS. 11a-c are schematic drawings illustrating embodiments relating to computer program products and computer programs to cause the communication device and/or the first network node and/or the second network node and/or the third node to perform the first method and/or second method and/or the third method and/or the fourth method, respectively.
Figure 11B:
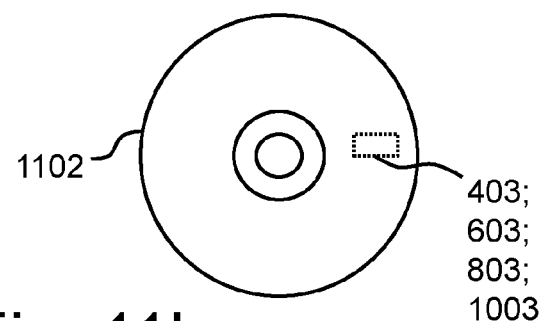
Figure 11C:
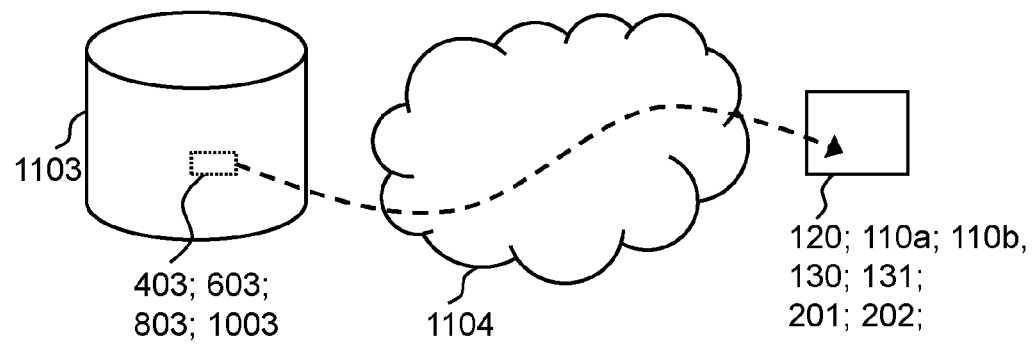

FIGS. 11a-c are schematic drawings illustrating embodiments relating to a computer program that may be any one of the computer programs 403, 503, 803, 1003 and that comprises instructions that when executed by the processing circuits 404, 604, 804, 1004, respectively, and/or the processing modules 401, 601, 801, 1001 respectively, causes the communication device 120, and/or the first network node 110a, and/or the second network node 110b, and/or arrangement 1000, to perform as described above.

In some embodiments there is provided a carrier, such as a data carrier, e.g. a computer program product, comprising any one or more of the computer programs 403, 503, 803, 1003. The carrier may be one of an electronic signal, an optical signal, a radio signal, and a computer readable medium. Any one, some or all of the computer programs 403, 503, 803, 1003 may thus be stored on the computer readable medium. By carrier may be excluded a transitory, propagating signal and the carrier may correspondingly be named non-transitory carrier. Non-limiting examples of the carrier being a computer-readable medium is a memory card or a memory stick 1101 as in FIG. 11a, a disc storage medium 1102 such as a CD or DVD as in FIG. 11b, a mass storage device 1103 as in FIG. 11c. The mass storage device 1103 is typically based on hard drive(s) or Solid State Drive(s) (SSD). The mass storage device 1103 may be such that is used for storing data accessible over a computer network 1104, e.g. the Internet or a Local Area Network (LAN).

Any one, some or all of the computer programs 403, 503, 803, 1003 may furthermore be provided as a pure computer program or comprised in a file or files. The file or files may be stored on the computer-readable medium and e.g. available through download e.g. over the computer network 1104, such as from the mass storage device 1103 via a server. The server may e.g. be a web or File Transfer Protocol (FTP) server. The file or files may e.g. be executable files for direct or indirect download to and execution on the communication device 120, and/or the first network node 110a, and/or the second network node 110b, and/or arrangement 1000, to perform as described above, e.g. by any one, some or all of the processing circuits 404, 604, 804, 1004. The file or files may also or alternatively be for intermediate download and compilation involving the same or another processor to make them executable before further download and execution causing the communication device 120, and/or the first network node 110a, and/or the second network node 110b, and/or arrangement 1000 to perform as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors make the arrangement 500 and/or the network node 700 and/or the communication device 900 to be configured to and/or to perform the above-described first method, second method and third method, respectively.

Identification, e.g. by any identifier, herein may be implicit or explicit. The identification may be unique in the wireless communication network 100 or at least in a meaningful and relevant part or area thereof, as realized by the skilled person.

As used herein, each of the term "node", or "network node", "device", "arrangement" may refer to one or more physical entities, such as devices, apparatuses, computers, servers or the like. This may mean that any embodiment herein may be implemented in a single physical entity or alternatively, may be implemented in a plurality of physical entities, such as a system or arrangement comprising said one or more physical entities, i.e. some embodiments herein may be implemented in a distributed manner, such as on a set of interconnected devices, e.g. server machines of a cloud system, also known as e.g. computer cloud.

Note that in case it is possible and/or suitable, one or more embodiments herein, e.g. relating to one or more methods and/or entities, can be implemented in one and the same physical arrangement or entity.

As used herein, the term "unit" may refer to one or more functional units, each of which may be implemented as one or more hardware modules and/or one or more software modules in a node.

As an example, the expression "means" may be a module corresponding to the modules listed above in conjunction with the figures.

The term "network node" as used herein may as such in principle refer to any type of radio network node (described below) or any network node, which may communicate with at least a radio network node. Examples of such network nodes include any radio network node stated above, a core network node, an Operations & Maintenance (O&M) node, an Operations Support Systems (OSS) node, an Operation, Administration and Maintenance (OAM) node, a Self Organizing Network (SON) node, a positioning node etc. The term "radio network node" as used herein may as such refer to a network node comprised in a RAN, and is typically of a certain RAT, or any type of network node serving a wireless device, e.g. UE, and/or that are connected to and operating with other network node(s) or network element(s) or any radio node in order to send and/or receive radio signals to/from a communication device. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "communication device" as used herein, may as such refer to any type of communication device arranged to communicate with a radio network node in a wireless, communication network, such as the wireless communication network 100. Examples may include so called: device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc, just to mention some examples. While said terms are used frequently herein for convenience, or in the context of examples involving other 3GPP nomenclature, it must be appreciated that the term as such is non-limiting and the teachings herein apply to essentially any type of communication device.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first method, second method, and first arrangement, second arrangement, etc., and the like, as may be used herein, as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a first network node, for supporting identification of one or more neighboring network nodes comprised in a wireless communication network, the first network node being associated with a communicative connection to a communication device, wherein the method comprises:
    obtaining a first identifier identifying the first network node, and
    sending the obtained first identifier to the communication device, the first identifier to be transmitted by the communication device in the uplink so that the first identifier is receivable by one or more other, second network nodes, whereby receipt of the first identifier by the second network node enables identification of the first network node as neighboring said second network node, wherein the first identifier is obtained by being received from one or more third nodes, which one or more third nodes manages mapping between the first identifier and an address of the first network node in the wireless communication network, and/or mapping between the first identifier and a second identifier uniquely identifying the first network node in the wireless communication network.

2. The method as claimed in claim 1, wherein the first identifier is a random access sequence.

3. The method as claimed in claim 1, wherein the first identifier is an identifier allocated specifically to be transmitted in the uplink by one or more communication devices in order to enable said one or more second network nodes to receive the first identifier, and thereby enable said identification of the first network node as neighboring said one or more second network nodes.

4. The method as claimed in claim 1, wherein the first identifier is to be transmitted in the uplink during a certain time period when the one or more second network nodes are configured to specifically listen for such identifier with the purpose of identifying neighboring network nodes.

5. The method as claimed in claim 1, wherein the method further comprises:
    informing one or more third nodes about the obtained first identifier, which one or more third nodes manages mapping between the first identifier and an address of the first network node in the wireless communication network, and/or mapping between the first identifier and a second identifier uniquely identifying the first network node in the wireless communication network.

6. The method as claimed in claim 1, wherein the first identifier is obtained and/or sent in response to that the communication device has informed the first network node about a reference signal that the communication device has received from at least one of the said one or more second network nodes, but which reference signal was insufficient to identify at least one of the said one or more second network nodes.

7. A first network node configured to support identification of one or more neighboring network nodes comprised in a wireless communication network, the first network node being associated with a communicative connection to a communication device, wherein the first network node comprising:

a processor; and a memory storing instructions, configured to:

obtain a first identifier identifying the first network node, and send the obtained first identifier to the communication device, the first identifier to be transmitted by the communication device in the uplink so that the first identifier is receivable by one or more other, second network nodes, whereby receipt of the first identifier by the second network node enables identification of the first network node as neighboring said second network node, wherein the first network node is configured to obtain the first identifier by receiving it from one or more third nodes, which one or more third nodes manages mapping between the first identifier and an address of the first network node in the wireless communication network, and/or mapping between the first identifier and a second identifier uniquely identifying the first network node in the wireless communication network.

8. The first network node as claimed in claim 7, wherein the first identifier is a random access sequence.

9. The first network node as claimed in claim 7, wherein the first identifier is to be transmitted in the uplink during a certain time period when the one or more second network nodes are configured to specifically listen for such identifier with the purpose of identifying neighboring network nodes.

10. The first network node as claimed in claim 7, wherein the first network node is further configured to:

inform one or more third nodes about the obtained first identifier, which one or more third nodes manages mapping between the first identifier and an address of the first network node in the wireless communication network, and/or mapping between the first identifier and a second identifier uniquely identifying the first network node in the wireless communication network.

* * * * *